Jan. 3, 1928.

M. E. A. BAULE 1,655,125

SHIP'S LOG

Filed Jan. 29, 1924

Inventor
M.E.A. Baule
By Marks Clerk

Jan. 3, 1928.
M. E. A. BAULE
1,655,125
SHIP'S LOG
Filed Jan. 29, 1924
2 Sheets-Sheet 2
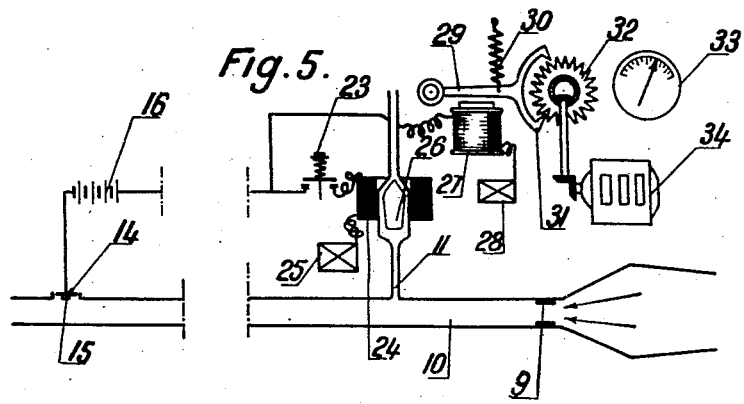
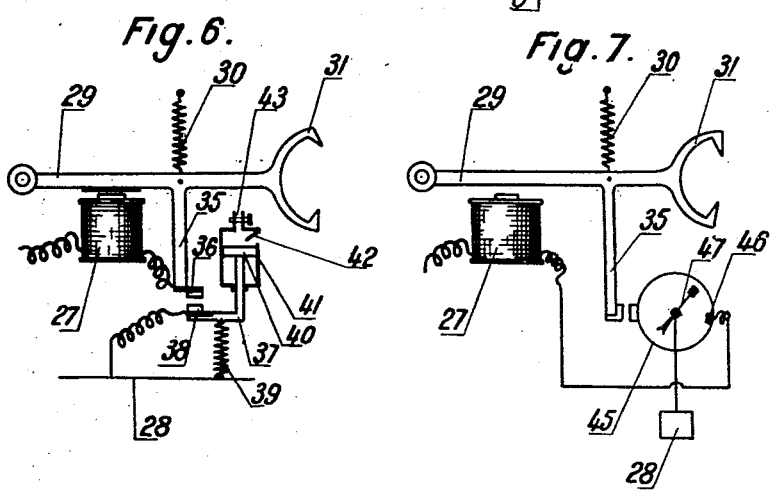
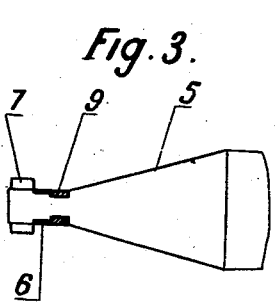

Patented Jan. 3, 1928.

1,655,125

UNITED STATES PATENT OFFICE.

MARIE EMILE ALFRED BAULE, OF TOULON, FRANCE.

SHIP'S LOG.

Application filed January 29, 1924, Serial No. 689,382, and in France December 19, 1923.

In most cases, the apparatus designated as logs which serve to indicate the speed of vessels or aircraft comprise a responsive element such as a vane-wheel, propeller, manometer or the like which is acted upon by the external fluid, and a water (or air) admission element situated at a suitable point and communicating with the said responsive element by an operating conduit.

But logs of this type are found to give inexact results and are very likely to get out of order; they are difficult to standardize, because there is as a rule no proportionality between the speed and the indications of the said responsive element; these differences are apparently due to the changes in the distribution of what are designated as pressure waves along the hull or main body when the speed of travel varies. Further the indications of the responsive element are affected by the pitching and rolling of the vessel whereby the indicating devices are caused to oscillate and the reading thus becomes difficult.

In the case of vessels properly so called, the various deposits of substances which are soon formed in the device will modify the action of the admission element.

On the other hand, the logs of the known types will only show the longitudinal speed and not the transverse speed.

In my invention these various drawbacks are obviated by providing the device with a water (or air) admission chamber of cylindrical or tapered shape which is open at the front end and comprises various additional inlets distributed over the whole surface of its main body, and with an analogous chamber or apparatus serving for the outflow of the water or air, thus obviating all differences due to modifications in the above-mentioned pressure waves. Further, in order to protect the device against effects of pitching and rolling, and of momentary variations in pressure, I provide one or more restricted portions in the main or operating conduit.

In the preferred constructional form of the device in accordance with the invention, the said main conduit is provided adjacent the forward end with an apparatus for the emission of air bubbles at stated intervals, and near its other end is disposed a contact piece insulated from the conduit and forming part of a circuit which is normally closed by the liquid in the conduit. When the air bubble passes over the said contact piece, the circuit is broken, and this action can be utilized for controlling an indicating or counting device, or the like.

The time which elapses between the emission of a bubble and the corresponding break in the circuit caused by the same, will serve to determine the speed of the vessel.

To eliminate the effect of air bubbles of excessive length or of parasitic bubbles which may be formed for instance when the main bubble is broken up into parts, I may use a device whereby the closing of the circuit is retarded for a stated time after it has been broken, so that only the front part of the bubble will affect the receiving apparatus. I may further combine with the said device a second and like device placed in transverse position, and will thus be enabled to measure the drift of the vessel.

The appended drawings show by way of example an embodiment of the said invention.

Fig. 3 is a cross-section of the rear part of the latter chamber.

Figs. 6 and 7 show two forms of a device for eliminating the effect of bubbles of excessive length or of parasitic bubbles.

Figure 1:
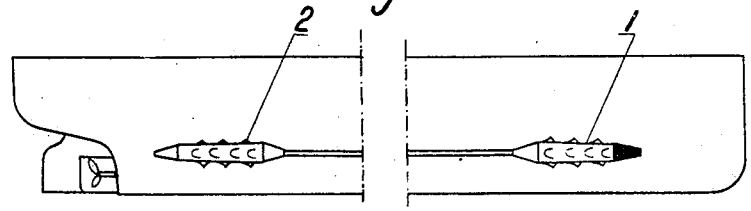
Fig. 1 shows the arrangement of the water chambers upon a vessel.

The log according to the invention comprises a fluid admission chamber 1 occupying the forward position, and a compensating chamber 2 placed in the rear whose construction resembles that of the preceding and which serves for the discharge of the fluid. In each case, the chamber consists of a main body 3 of tapered shape and small diameter, with the large end situated at the rear end. The portion 3 is open at the front and is provided with various lateral air inlets 4 disposed in quincunx upon the entire surface; it is joined to a tapered portion 5 ending in a tube 6 which carries the coupling device 7 for connecting the said chamber with the supply conduit. For use upon vessels, the front end may be covered by a strainer 8 of tapered shape.

Figure 2:
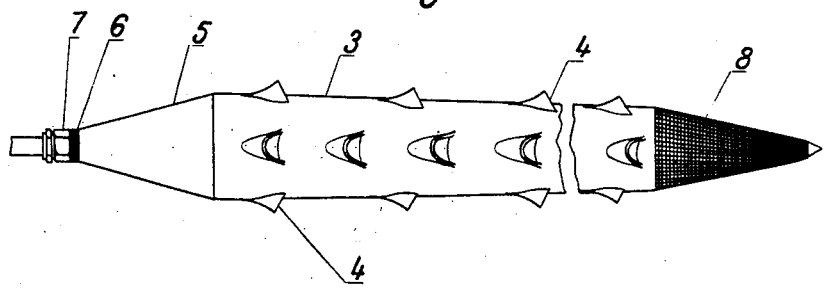
Fig. 2 shows the admission chamber on a larger scale.

The additional air inlets may have the form of gussets or the like, and for this purpose the pieces may be separately secured to the edges of holes pierced in the tube 2; or they may be formed by making transverse slots in the tube and properly turning up the edges. The external parts 4 must be flared outwardly towards the front, Fig. 2, so as to avoid all catching among plants or the like. By reason of the great length of the said admission chamber, and of the disposition of the additional air inlets upon the entire surface, I am enabled to obviate the effects of the pressure waves.

Figure 4:
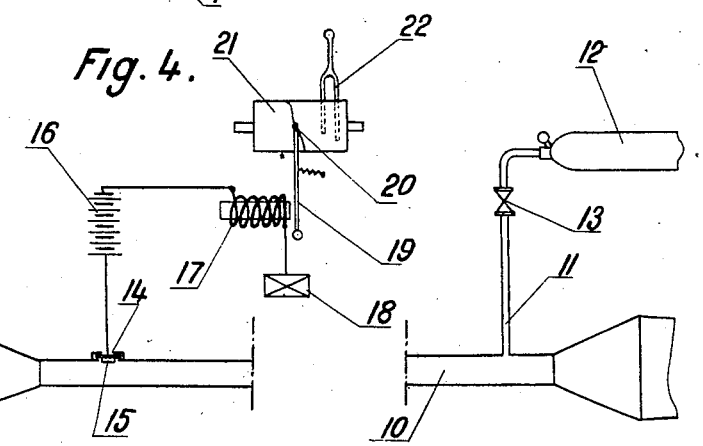
Fig. 4 shows a log apparatus of the air bubble type, in accordance with the invention, and Fig. 5 a modification.

The tube 6 has a restricted portion 9, Fig. 3, intended to slow up the flow of liquid in the supply conduit; this augments the precision of the measurements, and in the logs of the air-bubble type wherein measurement is made of the time of flow of the liquid over a given distance, this arrangement will compensate for the effect of the pitching and rolling of the vessel. A constructional form of air-bubble log utilizing the principles of my invention is shown in Fig. 4.

At the forward end of the main or operating conduit 10 is disposed the pipe 11 which is connected with a compressed air tank 12 and is provided with a closing device 13 which is momentarily opened at stated intervals. At the other end of the main conduit is mounted the contact-piece 15 which is insulated by the member 14; said contact piece is connected to an electric circuit comprising a battery 16, an electromagnet 17, and a metallic earth connection 18. This circuit is normally closed by the liquid in the main conduit. The armature 19 of the electromagnet is attached to a pointed member 20 co-operating with the registering drum 21. When the air bubble passes over the said contact piece, the circuit is momentarily broken; the armature, normally attracted by the electromagnet, will be separated therefrom by its spring and will make an abrupt deflection from the record line on the drum. By observing the time between the moment of emission of the bubble and the said recorded mark, the speed of the vessel may be determined.

By the use of the restricted part 9 for retarding the flow of the fluid in the operating circuit, I am enabled to considerably augment the duration of travel of the bubble, and thus the measurement becomes more exact. Further, by reason of the long duration of movement of the bubble, the various movements of pitching and rolling of the vessel are mutually compensated and their effect will thus be practically annulled.

It is preferable to arrange the device so that the emission of each bubble shall be controlled by the passage of the preceding bubble over the contact piece 15; in this case the number of bubbles emitted in a given time will be proportional to the velocity of the liquid in the conduit 10. The arrangement shown in Fig. 5 can be used for this purpose; the electric circuit connected with the contact piece 15 is divided into two branches; the first circuit comprises the contact piece 15, the battery 16, the switch 23, the solenoid 24 and the earth 25. The said solenoid contains the tube 11 and acts upon the core 26 which is secured to a valve adapted to close the said tube. When the solenoid is energized it lifts the core, and the valve thus closes the said tube; upon opening the circuit, the valve opens and a bubble escapes from the device.

The second circuit comprises the contact piece 15, the battery 16, the electromagnet 27 and the earth 28; the armature of said electromagnet which is controlled by the spring 30 is secured to an anchor 31 coacting with the escapement wheel 32. The interval or time between two bubbles is measured by the chronographic device 33. The escapement wheel 32 is connected through gearing with a counter 34 indicating the number of bubbles produced within a given time, whereby the mean velocity during this time may be determined. To provide for the escape of the first bubble, the switch 23 is operated.

In the said device, the apparatus is responsive to the passage of the whole of the bubble over the contact piece 15 as well as to the action of parasitic bubbles which may be formed for instance by the subdivision of the main bubble.

To prevent any action of the rear end of the air bubble or of such parasitic bubbles, it suffices to provide the apparatus with a device which prevents the closing of the circuit of the indicating device during a stated period of time after the front end of the bubble coincides with the contact piece 15; in this manner the apparatus is affected only by the front part of the bubble, and it will operate as soon as the said contact piece is surrounded by the bubble.

A constructional form of a device for eliminating the effect of the rear part of the bubble is shown in Fig. 6. The armature 29 is secured to an arm 35 upon which is mounted a contact piece 36 having connected thereto one end of the electromagnet 27; the arm 35 acts upon the rod of a piston 37 carrying the contact piece 38 which is connected to earth at 28 and is normally in contact with the contact piece 36. The rod 37 is urged upwardly by the spring 39, and is secured to a piston 40 co-operating with the cylinder 41; said cylinder communicates with the atmosphere through a restricted orifice 43 and also through an aperture provided with a clack valve 42 closing outwardly. When the main circuit is broken by the passage of a bubble, the electromagnet 27 is de-energized, and the armature is released by the action of the said spring; the contact pieces 36 and 38 are thus separated, since the upward motion of the rod 37 is retarded, and the circuit thus remains broken during the whole time taken by the rod 37 and the contact piece 38 to resume contact respectively with the arm 35 and the contact piece 36.

A second constructional form of the said device is shown in Fig. 7. The end of the electromagnet 27 is connected to an insulated contact piece 46 which is adjustable on the dial of a chronograph 45 whereof the pointer 47 is connected to earth and is normally in contact with the piece 46. When the passage of a bubble breaks the circuit of the electromagnet, the arm 35 secured to the armature acts upon the starting button of the chronograph which brings back the pointer 47 to zero and releases the device actuating the said pointer. The circuit thus remains open during the whole time which is taken by the pointer to return into contact with the piece 46.

Due to the shape of the water admission chamber and to the use of a compensating chamber for the outlet of the water, I am enabled to use the device for measuring the transverse speed of the vessel instead of the longitudinal speed, and for this purpose it suffices to dispose the apparatus so that the chambers 1 and 2 shall be perpendicular to the longitudinal plane of the vessel, and preferably symmetrical with respect to this plane; the fluid circulating in the main conduit of the log will now move in the desired direction and at a velocity depending on the transverse speed.

Instead of measuring the absolute value of the transverse speed, which is always small, a log which indicates the transverse speed may be combined with the main log device indicating the longitudinal speed, in order to obtain the angle of drift of the vessel.

Figure 8:
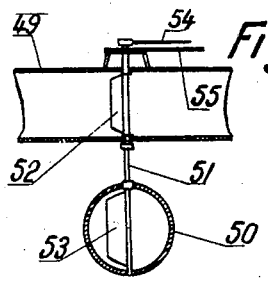
Figs. 8 and 9 are respectively sectional and plan views of a drift-indicating device.
Figure 9:
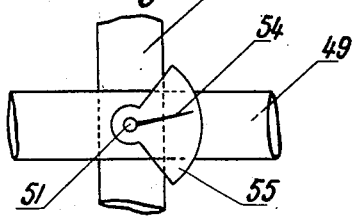

Figs. 8 and 9 show an arrangement for indicating the angle of drift. The main or operating conduit 49 of the longitudinal device, and the main conduit 50 of the transverse device cross one another at right angles in adjacent position. On the common perpendicular axis is disposed a shaft 51 upon which is mounted within the tube 49 a vane 52 and within the tube 50 a vane 53, the two vanes being in the same plane. The said shaft has at one end a pointer 54 moving over a dial 55 which is graduated in drift angles. When the transverse speed is null, the velocity of the fluid in the conduit 50 is also null; the vane 52 is disposed lengthwise of the conduit 49, and the pointer 54 is now at zero. Should the vessel have a certain transverse speed, the combination of the said shaft and the two vanes will assume a direction which is the resultant of the velocity of the fluid in the conduit 49 and 50, and the pointer 54 will show the value of the drift upon the dial.

What I claim is:

1. In apparatus for indicating the speed of a vessel in motion in a fluid a flow conducting means comprising a chamber for the admission of the fluid having an elongated tube which is open at one end and has a plurality of additional lateral inlets regularly distributed along said tube, a similar chamber reversely arranged for the discharge of the fluid and means connecting the last mentioned chamber with the first mentioned chamber.

2. In apparatus for indicating the speed of a vessel in motion in a fluid a flow conducting means comprising a chamber for the admission of the fluid having an elongated tube which is open at one end and has a plurality of additional lateral inlets regularly distributed along said tube, a similar chamber reversely arranged for the discharge of the fluid, means connecting the last mentioned chamber with the first mentioned chamber and a strainer of tapered shape at the open end of the fluid admission chamber.

3. In apparatus for indicating the speed of a vessel in motion in a fluid a flow conducting means comprising a chamber for the admission of the fluid having an elongated tube which is open at one end and has a plurality of additional lateral inlets flared outwardly towards the front regularly distributed upon said tube, a similar chamber reversely arranged for the discharge of the fluid and means connecting the last mentioned chamber with the first mentioned chamber.

4. In apparatus for indicating the speed of a vessel in motion in a fluid, a flow conducting means comprising a chamber for the admission of the fluid, having an elongated tube which is open at one end and has a plurality of additional lateral inlets regularly distributed upon said tube, a measuring device, a conduit for the flow of the fluid from said chamber to the measuring device having a restricted portion therein, and a chamber at the rear end of the conduit for the discharge of the fluid similar to the admission chamber but reversely arranged thereto.

5. In apparatus for indicating the speed of a vessel in motion in water a flow conducting means comprising a chamber for the admission of the water having an elongated tube which is open at one end and has a plurality of additional lateral inlets regularly distributed upon said tube, a chamber for the discharge of the water similar to the admission chamber but reversely arranged thereto, an operating conduit for directing the flow of the water from said chamber to the discharge chamber, a device provided at the forward end of said operating conduit for the emission of air bubbles at stated intervals into the said operating conduit, at the rear end of said operating conduit a contact piece on the inner wall of said conduit but insulated therefrom, an electric circuit a part of which is formed by said contact piece, a breaking device in said circuit and a registering device controlled by said breaking device.

6. In apparatus for indicating the speed of a vessel in motion in water a flow conducting means comprising a chamber for the admission of the water, having an elongated tube which is open at one end and has a plurality of additional lateral inlets regularly distributed upon said tube, a chamber for the discharge of the water similar to the admission chamber but reversely arranged thereto, an operating conduit for directing the flow of the water from said chamber to the discharge chamber, a device provided at the forward end of said operating conduit for the emission of air bubbles at stated intervals into said operating conduit, at the rear end of said operating conduit a contact piece on the inner wall of said conduit but insulated therefrom, means whereby the emission of each air bubble from abovementioned device is effected by the passage of the preceding air bubble over the contact piece, said means including, an electric circuit a part of which is formed by said contact piece, a breaking device in said circuit, and a registering device controlled by said breaking device.

7. In apparatus for indicating the speed of a vessel in motion in water, a flow conducting means comprising a chamber for the admission of the water in the form of an elongated tube which is open at one end and has a plurality of additional lateral inlets regularly distributed upon said tube, a chamber for the discharges of the water, similar to the admission chamber but reversely arranged thereto, an operating conduit for directing the flow of the water from said chamber to the discharge chamber, a device provided at the forward end of said operating conduit for the emission of air bubbles at stated intervals into said operating conduit, at the rear end of said operating conduit a contact piece on the inner wall of said conduit but insulated therefrom, an electric circuit a part of which is formed by said contact piece, a braking device in said circuit and a registering device controlled by said breaking device and comprising an electromagnet, an anchor secured to the armature of said electromagnet, an escapement wheel coacting with said anchor, a counter connected with said escapement wheel and a chronograph the release device of which is actuated by said escapement wheel.

8. In apparatus for indicating the speed of a vessel in motion in water, a flow conducting means comprising a chamber for the admission of the water in the form of an elongated tube which is open at one end and has a plurality of additional lateral inlets regularly distributed upon said tube, a chamber for the discharge of the water similar to the admission chamber but reversely arranged thereto, an operating conduit for directing the flow of the water from said chamber to the discharge chamber, a device provided at the forward end of said operating conduit for the emission of air bubbles at stated intervals into said operating conduit at the rear end of said operating conduit, a contact piece on the inner wall of said conduit, but insulated therefrom, an electric circuit a part of which is formed by said contact piece, a breaking device in said circuit, a device adapted to prevent the closing of said circuit during a stated time after each break of the circuit and a registering device controlled by said breaking device.

9. In apparatus for indicating the speed of a vessel in motion in water, a flow conducting means comprising a chamber for the admission of the water in the form of an elongated tube which is open at one end and has a plurality of additional lateral inlets regularly distributed upon said tube, a chamber for the discharge of the water, similar to the admission chamber but reversely arranged thereto, an operating conduit for directing the flow of the water from said chamber to the discharge chamber, a device provided at the forward end of said operating conduit for the emission of air bubbles at stated intervals into said operating conduit, a contact piece disposed on the inner wall and at the rear end of said operating conduit, but insulated therefrom, an electric circuit a part of which is formed by said contact piece, a breaking device in said circuit, a registering device controlled by said breaking device and comprising an electromagnet a contact piece secured to the armature of said electromagnet and connected with one terminal of the electromagnet a damping cylinder, a piston in said cylinder and a contact piece for cooperation with said first named contact piece attached to the rod of said piston and connected to earth.

10. In apparatus for indicating the speed of a vessel in motion in water, a flow conducting means comprising a chamber for the admission of the water, in the form of an elongated tube which is open at one end, and has a plurality of additional lateral inlets regularly distributed upon said tube, a chamber for the discharge of the water similar to the admission chamber but reversely arranged thereto, an operating conduit for directing the flow of the water from said chamber to the discharge chamber a device provided at the forward end of said operating conduit for the emission of air bubbles at stated intervals into said operating conduit, a contact piece disposed on the inner wall and at the rear end of said operating conduit, but insulated therefrom, an electric circuit a part of which is formed by said contact piece, a breaking device in said circuit, a registering device controlled by said breaking device and comprising an electromagnet, an anchor secured to the armature of said electromagnet, an escapement wheel coacting with said anchor, a counter connected with said escapement wheel, a chronograph, a release device for said chronograph adapted to be actuated by the escapement wheel and means whereby the chronograph is adapted to close the electric circuit after a predetermined time.

In witness whereof I have hereunto set my hand.

MARIE EMILE ALFRED BAULE.